(12) United States Patent
Youn

(10) Patent No.: US 6,320,638 B1
(45) Date of Patent: Nov. 20, 2001

(54) LIQUID CRYSTAL DISPLAY DEVICE

(75) Inventor: Won Gyun Youn, Kyungsangbuk-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/522,837

(22) Filed: Mar. 10, 2000

(30) Foreign Application Priority Data

Mar. 11, 1999 (KR) .................................................... 99-8056

(51) Int. Cl.[7] .................................................. G02F 1/1337
(52) U.S. Cl. ............................................. 349/154; 349/139
(58) Field of Search ..................................... 349/139, 154, 349/189, 190

(56) References Cited

U.S. PATENT DOCUMENTS 5,751,391 * 5/1998 Yokoyama et al. .................. 349/154

* cited by examiner

*Primary Examiner*—James A. Dudek
(74) *Attorney, Agent, or Firm*—Long Aldridge & Norman LLP

(57) ABSTRACT

A liquid crystal display device having an electrode structure capable of easily curing a sealant. In the device, at least one of signal wiring is arranged on a substrate provided with liquid crystal injection holes. The signal wiring has a shape curved at an inflow position of the sealant. The signal wiring to be arranged at the inflow position of the sealant is formed to depart from the inflow position or is partially removed.

4 Claims, 6 Drawing Sheets

LIQUID CRYSTAL DISPLAY DEVICE

BACKGROUND OF THE INVENTION

1. Field of the Invention

This invention relates to a liquid crystal display device, and more particularly to a liquid crystal display device having such an electrode structure that a sealant can be easily cured.

2. Description of the Related Art

Generally, a liquid crystal display (LCD) device controls the light transmissivity of liquid crystal cells in accordance with video signals to thereby display a picture corresponding to the video signals on a liquid crystal panel having the liquid crystal cells arranged in a matrix pattern. To this end, the LCD device includes an active area having the liquid crystal cells arranged in an active matrix type, and driving circuits for driving the liquid crystal cells in the active area. More specifically, the LCD device includes a lower plate in which thin film transistors for switching the liquid crystal cells, driving circuits for driving the thin film transistors and signal lines connected between the driving circuits and the thin film transistors are mounted on a lower substrate; an upper plate having color filters coated on a upper substrate in correspondence with the matrix liquid crystal cells in such a manner to be separated for each cell area by a black matrix stripe, and transparent electrodes coated on the surfaces of the color filters; a spacer provided between the upper plate and the lower plate to assure a certain cell gap; and a liquid crystal cell filled in a space defined between the upper and lower plates by the spacer. Such a liquid crystal display device is fabricated by preparing the upper plate and the lower plate separately to adhere them to each other and then injecting a liquid crystal through liquid crystal injection holes provided at the side portion thereof, and thereafter by coating the liquid crystal injection holes with a sealant and then curing the sealant. In this case, the sealant is cured by irradiating an ultraviolet ray continuously from the side portion and the rear portion after the coating. A reason why an ultraviolet ray is not irradiated from the front portion is because the color filters are coated on the upper substrate to prevent an ultraviolet ray from being transmitted. If the sealant is left alone as it is after the coating upon mass production of the LCD device, however, the sealant with a viscosity flows into the interior thereof. Accordingly, when an ultraviolet ray is irradiated from the side portion and the rear portion of the LCD device, metal signal wiring mounted on the lower substrate shuts off an ultraviolet ray irradiated from the rear portion and thus the flowing sealant is left without being completely cured to react on the liquid crystal, thereby causing a problem in that a stain is produced on the screen. Hereinafter, the above-mentioned problem in the LCD device will be described in detail with reference to the accompanying drawings. FIG. 1 and FIG. 2 is a plan view and a perspective view showing a portion of the LCD device 10 provided liquid crystal injection holes 22, respectively. In FIG. 1, first to third signal wiring 14, 16 and 18 are arranged at the outer area 28 of an active area 26 in which thin film transistors and pixel electrodes are mounted on a lower plate 12. A seal 20 coated with an adhesive and injection holes 22 for injecting a liquid crystal are provided in a desired shape. The first signal wiring 14 is gate row lines for applying a low-level voltage to gate lines in the active area 26, the second wiring 16 is redundancy lines, and the third wiring 18 is common voltage lines for applying a common voltage. After the lower plate having the structure as described above and the upper plate 30 prepared separately were arranged in position and adhered to each other with the aid of the seal coated with an adhesive, a liquid crystal is injected through the liquid crystal injection holes 22 provided at the side portion. The liquid crystal injection holes 22 are sealed by coating the liquid crystal injection holes 22 with a sealant 24 with a viscosity and thereafter curing the same by a continuous irradiation of ultraviolet ray (UV) before the sealant 24 flows into the interior thereof. In this case, since a major area of the upper plate 30 of the LCD device 10 is coated with the color filters to shield a UV, the UV is usually irradiated from the side portion and the rear portion of the LCD device as shown in FIG. 2.

By the way, if the LCD device is left alone for more than a certain time after coating of the sealant upon its mass production, the sealant flows into an area in which the first to third signal wiring 14, 16 and 18 are arranged. In this case, since the signal wiring arranged on the lower plate, particularly, the third signal wiring 18 adjacent to the liquid crystal injection holes 22 shuts off a UV irradiated from the rear portion of the LCD device, there occurs a phenomenon that the sealant 24 flowing into the third signal wiring 18 is not cured and thus flows into the active area 26. Accordingly, the sealant flowing into the active area 26 reacts on the liquid crystal to thereby cause a problem in that a stain is generated on the screen.

SUMMARY OF THE INVENTION

Accordingly, it is an object of the present invention to provide a liquid crystal display device that is capable of preventing a stain from being generated at the peripherals of liquid crystal injection holes due to a non-curing of a sealant, by changing a shape of signal wiring to prevent a shut-off of an ultraviolet ray irradiated from the rear portion thereof.

In order to achieve these and other objects of the invention, a liquid crystal display device according to one aspect of the present invention includes at least one signal wiring arranged on a substrate provided with liquid crystal injection holes and has a shape indented at an inflow position of a sealant.

A liquid crystal display device according to another aspect of the present invention includes at least one signal wiring arranged on a substrate provided with liquid crystal injection holes and is set to have a smaller width at an inflow position of a sealant.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 1:
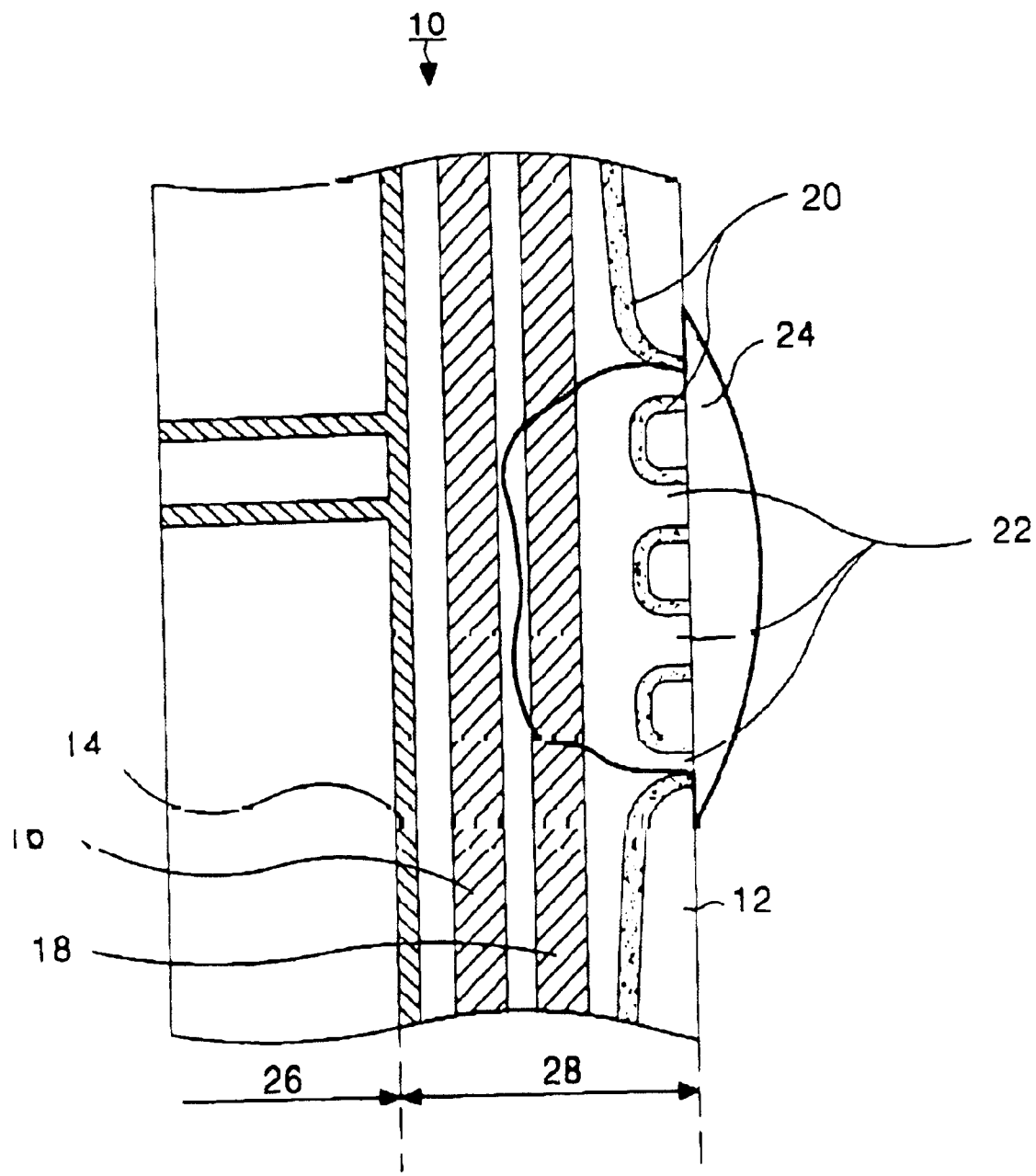
FIG. 1 is a plan view showing the structure of the peripherals of liquid crystal injection holes in the conventional liquid crystal panel.
Figure 2:
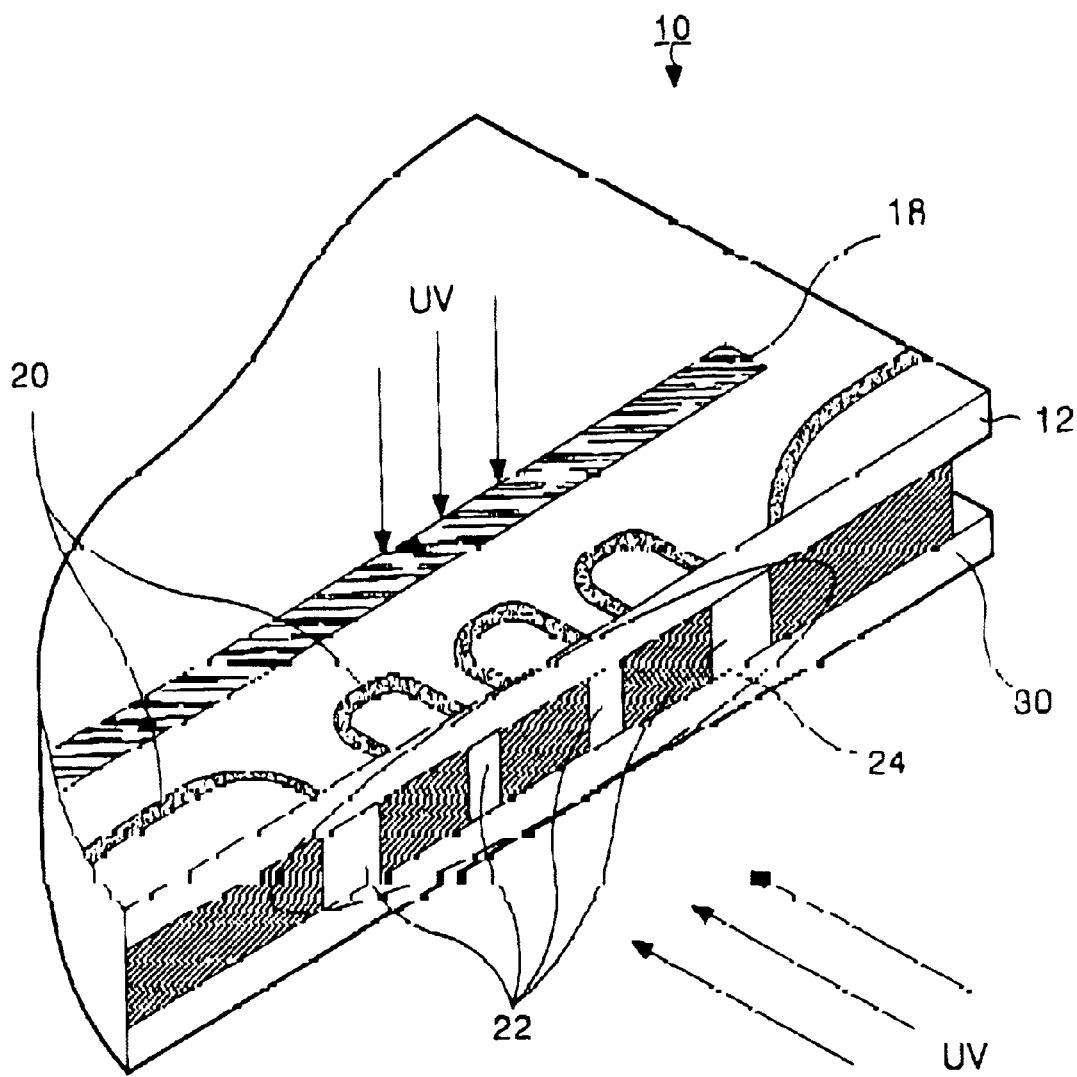
FIG. 2 is a perspective view showing an irradiation direction of an ultraviolet for providing a sealant curing of the peripherals of the liquid crystal injection holes in FIG. 1.
Figure 3:
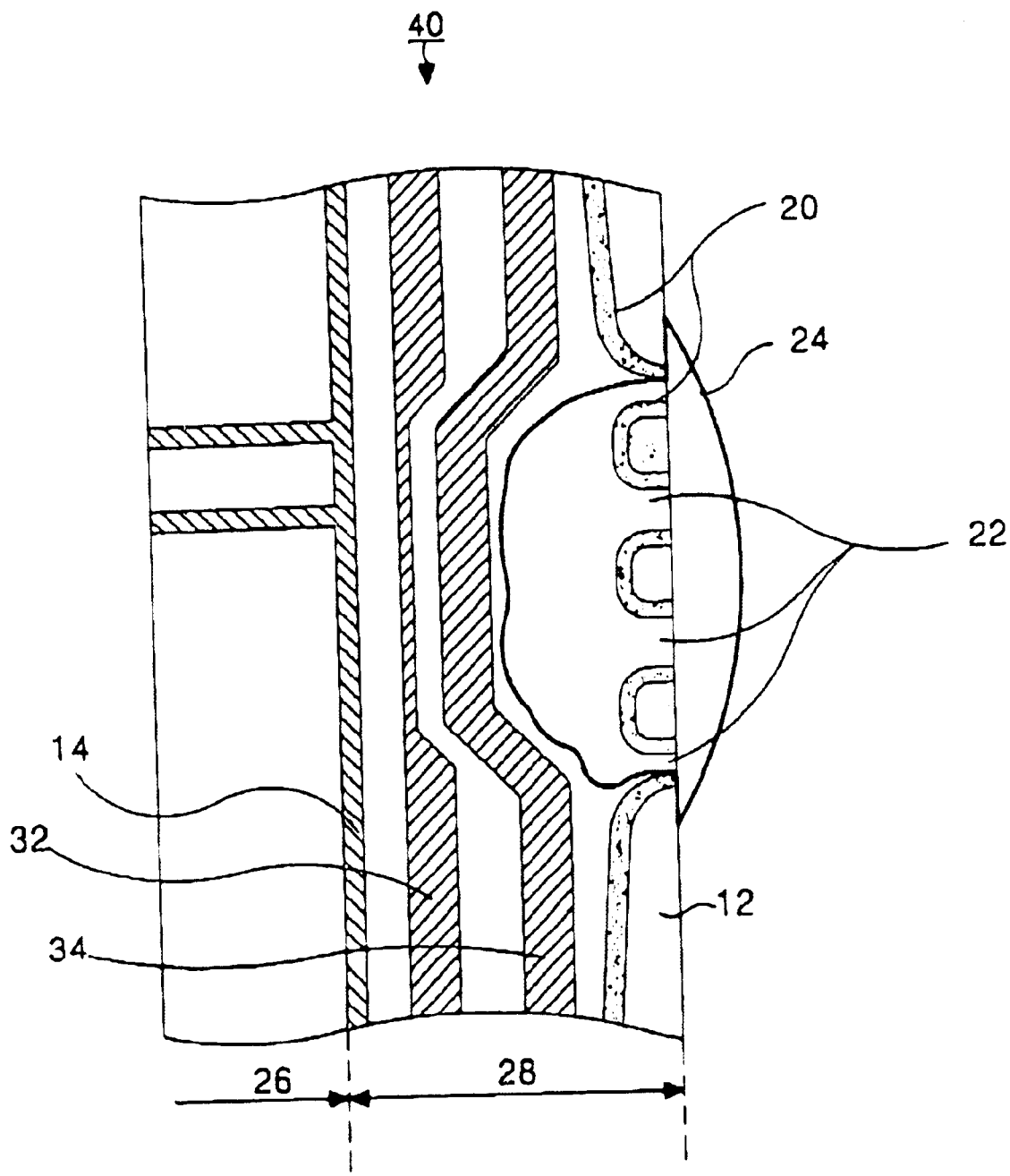
FIG. 3 is a plan view showing the structure of the peripherals of liquid crystal injection holes in a liquid crystal display device according to an embodiment of the present invention.
Figure 4:
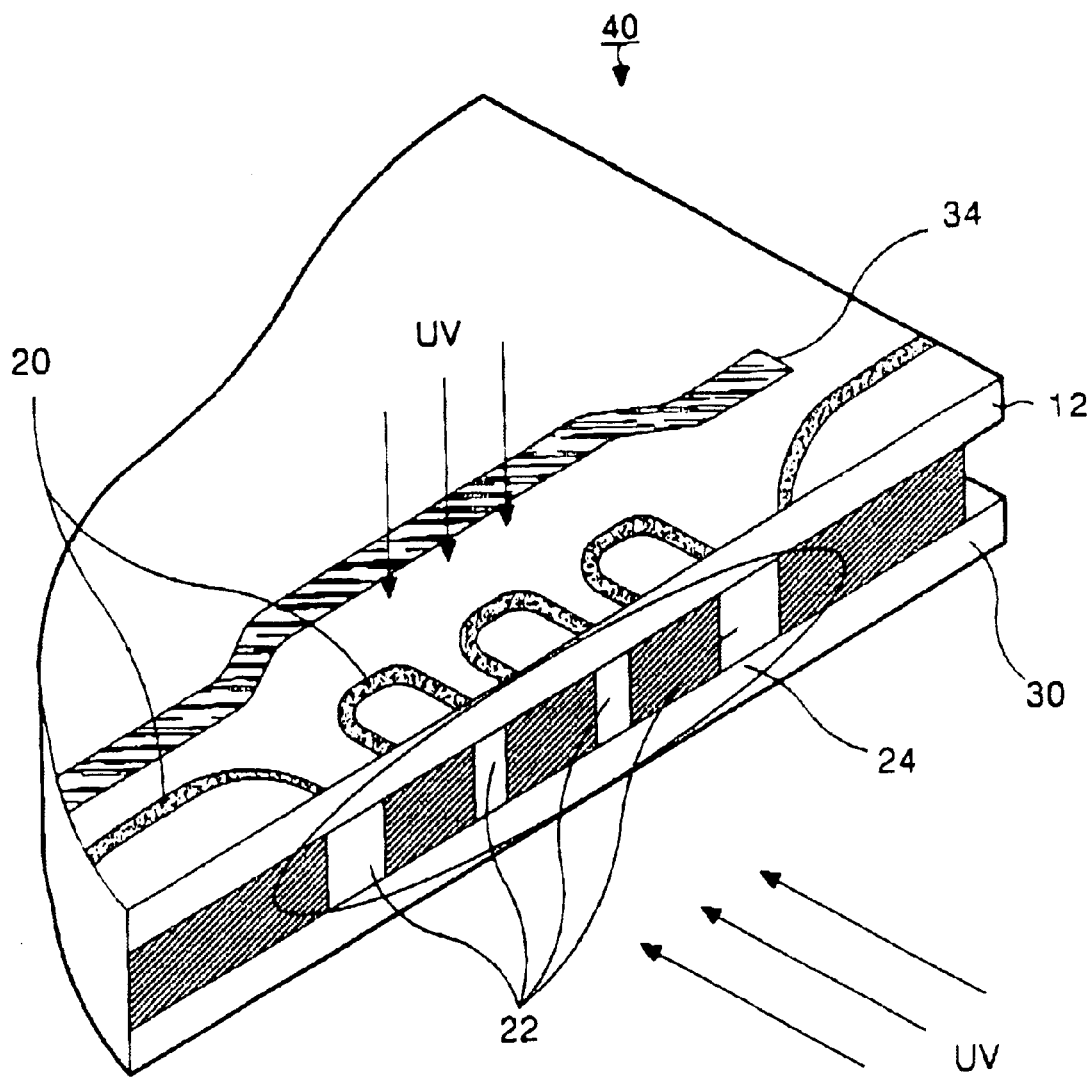
FIG. 4 is a perspective view showing an irradiation direction of an ultraviolet for providing a sealant curing of the peripherals of the liquid crystal injection holes in FIG. 3.

FIG. 3 is a plan view showing the structure of the peripherals of liquid crystal injection holes in a liquid crystal display device according to an embodiment of the present invention, and FIG. 4 is a perspective view for explaining an irradiation direction of an ultraviolet for providing a sealant curing of the peripherals of the liquid crystal injection holes in FIG. 3. In FIG. 3, first to third signal wiring 14, 32 and 34 are arranged at the outer area 28 of an active area 26 in which thin film transistors and pixel electrodes are mounted on a lower plate 12. A seal 20 coated with an adhesive along with injection holes 22 for injecting a liquid crystal are provided in a desired shape. The first signal wiring 14 is gate row lines for applying a low-level voltage to gate lines in the active area 26, the second wiring 32 is redundancy lines, and the third wiring 34 is common voltage lines for applying a common voltage. In this case, the third signal wiring 34 arranged in the vicinity of the liquid crystal injection holes 22 is designed to depart from the inflow position of the sealant 24 in such a manner that it does not shut off an ultraviolet ray for curing the inflow sealant 24. The sealant 24 usually permits an inflow of more than 1 mm after the sealing. Thus, since the inflow of the sealant 24 can be made into a position of about 1.5 mm from the liquid crystal injection holes 22 of the lower substrate 12, the signal wiring is arranged to depart from this position. For instance, as shown in FIG. 3 and FIG. 4, the third signal wiring 34 can be designed to have a shape indented toward the active area 26 with departing from the inflow position of the sealant 24. The adjacent second signal wiring 32 also can be designed into a shape having a recess corresponding to the indented portion of the third signal wiring 34 in such a manner to be not overlapped with the third signal wiring 34 having a indented shape. Accordingly, when the liquid crystal injection holes 22 is coated with the sealant 24 and cured by the irradiation of an ultraviolet ray after the upper plate 30 and the lower plate 12 prepared separately were adhered to each other and a liquid crystal was injected through the liquid crystal injection holes 22, the third signal wiring 34 arranged on the lower substrate 12 does not shut off a UV irradiated from the rear portion of the liquid crystal display device 40, so that the sealant 24 can be completely cured. As a result, the stain generation of screen caused by the non-curing of the sealant in the prior art can be prevented.

Figure 5:
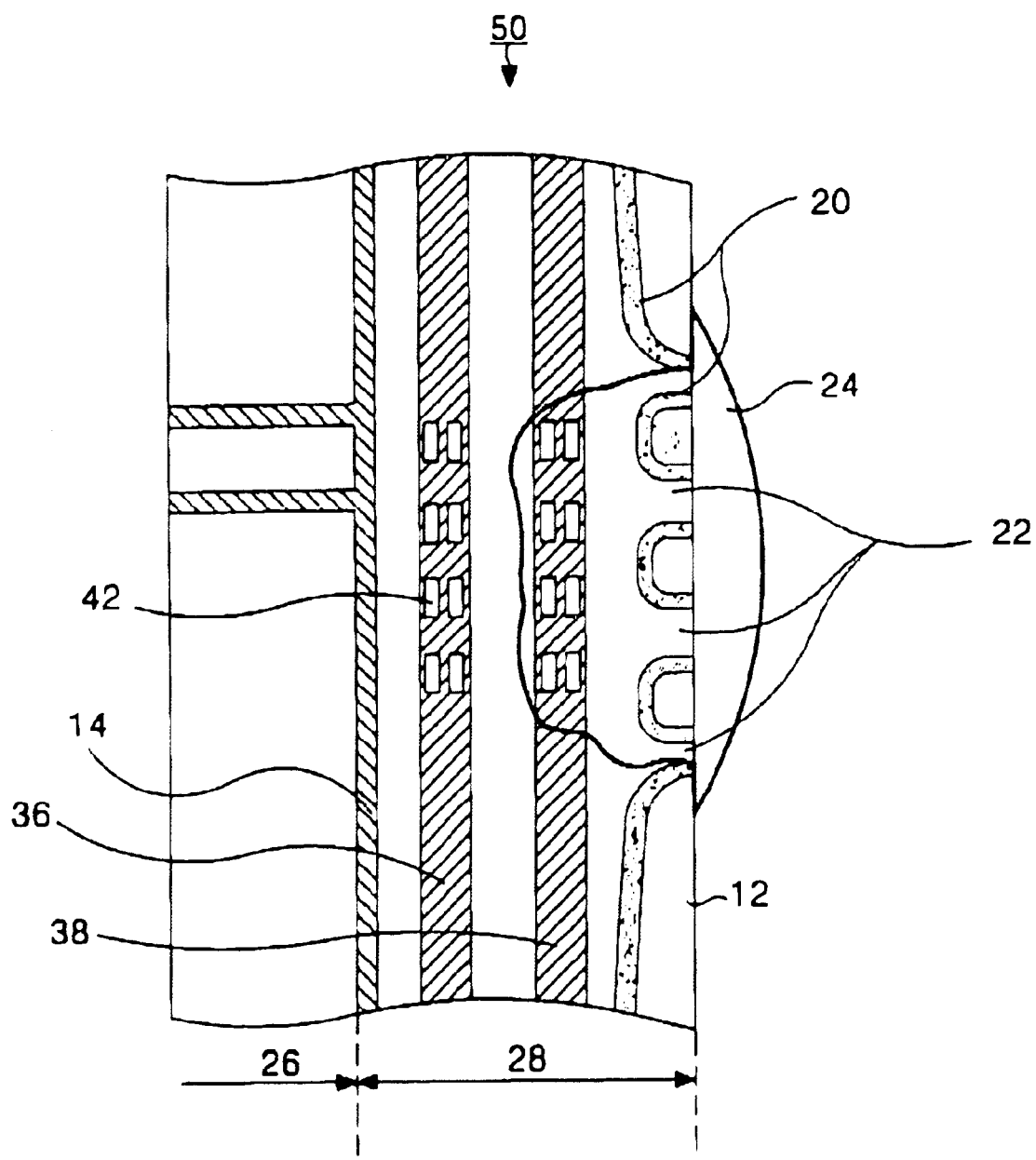
FIG. 5 is a plan view showing the structure of the peripherals of liquid crystal injection holes in a liquid crystal display device according to another embodiment of the present invention.
Figure 6:
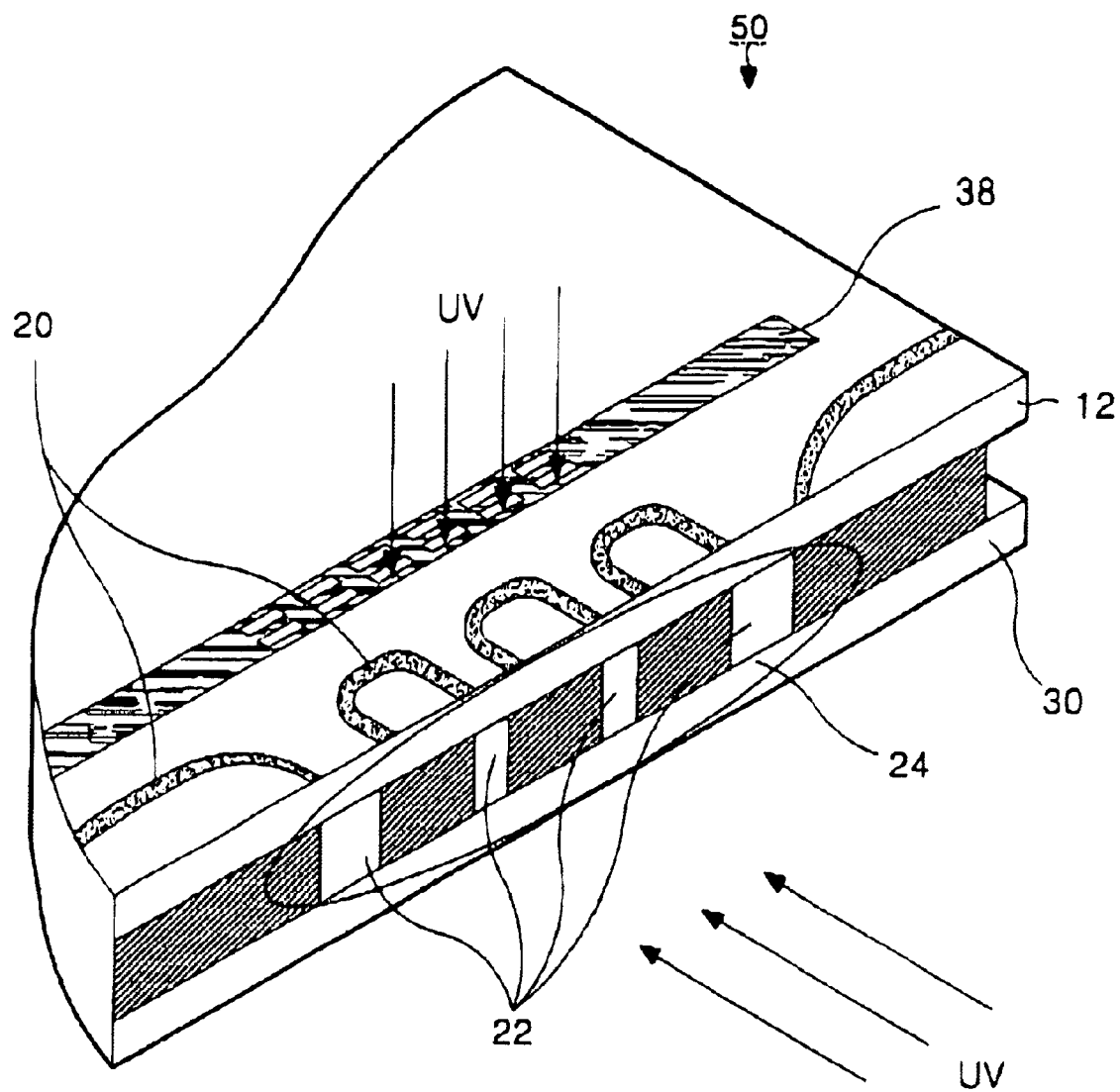
FIG. 6 is a perspective view showing an irradiation direction of an ultraviolet for providing a sealant curing of the peripherals of the liquid crystal injection holes in FIG. 5.

FIG. 5 is a plan view showing the structure of the peripherals of liquid crystal injection holes in a liquid crystal display device according to another embodiment of the present invention, and FIG. 6 is a perspective view for explaining an irradiation direction of an ultraviolet for providing a sealant curing of the peripherals of the liquid crystal injection holes in FIG. 4. In FIG. 5 and FIG. 6, a number of holes 42 are formed in the second and third signal wiring 36 and 38 arranged at the inflow position of the sealant 24 to transmit a UV irradiated from the rear portion of the liquid crystal display device 50 into the inflow sealant 24. The holes 42 are defined using protective films formed during a process of fabricating the thin film transistors of the lower plate 12. Alternatively, the width of the second and third signal wiring 36 and 38 may be set to be smaller at inflow position of the sealant 24 to increase a UV transmission amount. Accordingly, when the liquid crystal injection holes 22 is coated with the sealant 24 and then cured by the irradiation of an ultraviolet ray after a liquid crystal was injected through the liquid crystal injection holes 22, the second and third signal wiring 36 and 38 arranged on the lower substrate 12 does not shut off a UV irradiated from the rear portion of the liquid crystal display device 50, so that the sealant 24 can be completely cured with the aid of a UV irradiated from the side portion and the rear portion. As a result, the stain generation of screen caused by the non-curing of the sealant in the prior art can be prevented.

As described above, according to the present invention, the signal wiring arranged at the inflow position of the sealant is formed to depart from the inflow position or is partially removed. Accordingly, a UV irradiated from the rear portion is sufficiently irradiated onto the inflow sealant, so that the stain generation of the screen caused by the uncured sealant can be prevented.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A liquid crystal display device, comprising:
   at least one signal wiring arranged on a substrate provided with liquid crystal injection holes, said signal wiring having a shape indented at an inflow position of a sealant.

2. The liquid crystal display device as claimed in claim 1, wherein said signal wiring has a shape curved into the interior of the liquid crystal display device in such a manner that an ultraviolet ray irradiated from the sealant can be transmitted.

3. A liquid crystal display device, comprising:
   at least one signal wiring arranged on a substrate provided with liquid crystal injection holes, said signal wiring being set to have a smaller width at an inflow position of a sealant.

4. The liquid crystal display device as claimed in claim 3, wherein said signal wiring is formed at the inflow position of the sealant and has at least one of hole for transmitting an ultraviolet ray irradiated from the sealant.

* * * * *